United States Patent [19]
Goodman et al.

[11] 4,271,524
[45] Jun. 2, 1981

[54] SPREAD SPECTRUM FH-MFSK RECEIVER

[75] Inventors: David J. Goodman, Aberdeen Township, Monmouth County; Paul S. Henry; Vasant K. Prabhu, both of Holmdel, all of N.J.

[73] Assignee: Bell Telephone Laboratories, Incorporated, Murray Hill, N.J.

[21] Appl. No.: 124,564

[22] Filed: Feb. 25, 1980

[51] Int. Cl.³ .......................... H04J 6/00; H04B 15/00
[52] U.S. Cl. .......................................... 375/1; 370/93; 455/38
[58] Field of Search .................. 375/1, 17, 40, 48, 89; 455/31, 32, 38, 50, 52, 161, 296; 370/19, 20, 21, 60, 91, 92, 93, 94, 107; 371/36

[56] References Cited

U.S. PATENT DOCUMENTS

| | | | |
|---|---|---|---|
| 3,432,619 | 3/1969 | Blasbalg | 370/93 |
| 3,916,313 | 10/1975 | Lowry | 375/1 |
| 4,030,033 | 6/1977 | Bibl et al. | 375/1 |
| 4,066,964 | 1/1978 | Costanza et al. | 455/38 |

OTHER PUBLICATIONS

27th IEEE Vehicular Conference Record: Mar. 16-18, 1977, "A Spread Spectrum Technique for High Capacity Mobile Communications", G. R. Cooper pp. 98-103.
28th IEEE Vehicular Tech. Conf. Record: Mar. 22-24, 1978, pp. 98-104.
4th Int. Conf. on Digital Satellite Comm.: Oct. 23-25, 1978, pp. 166-174.
1979 Ultrasonics Symposium Proceedings, Sep. 26-28, 1979, Paper E-1 by R. C. Williamson et al.

*Primary Examiner*—Benedict V. Safourek
*Attorney, Agent, or Firm*—Erwin W. Pfeifle

[57] ABSTRACT

The present invention relates to a majority logic spread spectrum, FH-MFSK radio receiver capable of demodulating and decoding one or more concurrently received L-length frequency-hopping, $2^K$-ary frequency shift keyed signals to determine the correct signal of a particular user. In operation, the receiver spectrum-analyzes the received signal to determine which frequency components are present during each of the L chip intervals and then modulates a particular user's L-length FH address signal with the derived frequency components to arrive at a $2^K$ by L-length detection matrix. A majority logic decision circuit determines the level having the maximum number of derived frequency components along the L-length axis of the matrix, or which is the most likely level of multiple equal levels, and decodes the chosen $2^K$ level into the indicated message signal.

7 Claims, 9 Drawing Figures

SPREAD SPECTRUM FH-MFSK RECEIVER

BACKGROUND OF THE INVENTION

1. Field of the Invention

The present invention relates to a spread spectrum frequency-hopping multilevel frequency shift keying (FH-MFSK) receiver and, more particularly, to a spread spectrum L-length frequency-hopping sequence, $2^K$ level frequency shift keying receiver which is capable of decoding an L-length received signal using a particular user's FH address sequence and choosing one of one or more of the $2^K$ levels having a maximum value equal to or less than L or some predetermined absolute value for conversion to a user's indicated received signal.

2. Description of the Prior Art

Spread spectrum radio communication systems using various modulation techniques have evolved to provide protection of transmitted radio signals from detection, demodulation and/or interference by outside sources. In multiple access spread spectrum communication, each user has access to the whole system bandwidth. One way of distinguishing the signals from different users is to give each user an address consisting of a fixed pattern in time and frequency. The information to be transmitted is modulated or coded onto the address. The receiver detects the appropriate address and decodes the message. This technique is often referred to as random-access-discrete-address (RADA) or code-division multiple access (CDMA).

The two major impairments of mobile radio communication systems are interference from other users and multipath fading. The conventional Frequency Division Multiple Access (FDMA) technique uses guard bands between frequency channels to minimize interference and increased signal power to combat fading. Recently, various frequency-hopping (FH) techniques have been proposed for use in mobile and satellite radio systems.

One such technique is disclosed in the article "A Spread Spectrum Technique for High Capacity Mobile Communications" by G. R. Cooper et al in the Conference Record of the *Twenty-Seventh Annual IEEE Vehicular Technology Conference* at Orlando, Fla. on March 16-18, 1977 at pages 98-103 which relates to a cellular spread spectrum frequency-hopped, differential phase shift keying (FH-DPSK) mobile communication system. In a typical receiver an array of delay lines and bandpass filters selects the desired address waveform out of the incoming signal. The phases of the various elements of the desired signal are detected relative to the previous word and are then passed through a linear combiner and maximum-likelihood decision circuit for proper processing.

Another technique for use with a satellite communication system is disclosed in the article "A Processing Satellite Transponder for Multiple Access by Low-Rate Mobile Users" by A. J. Viterbi in the Conference Record of the *Fourth International Conference on Digital Satellite Communications* at Montreal, Canada on October 23-25, 1978 at pages 166-174 which relates to a frequency-hopping, multilevel frequency shift-keyed (FH-MFSK) arrangement. In the disclosed receiving section, a set of received $2^K$ level, L-length signals are spectrally decoded and processed to select a produced L-length transmission as the decoded signal. If two or more L-length signals are produced, resolution would be to arbitrarily choose one as the correct message.

The use of FH-MFSK techniques with mobile radio communication systems, however, provides problems of, for example, multipath fading and noise which are not necessarily as prevalent in satellite communication systems. Typically, multipath propagation and noise would lead to imperfect tone detection of the various concurrent frequency-hopped signals at the receiver, causing additional errors. In many instances, multiple full L-length levels may be found in decoding a received signal of many concurrent users and also at many other instances the degrading of certain signals by multipath propagation and noise may result in no full L-length signal sequence being found at the receiver.

The problem remaining in the prior art is to provide a FH-MFSK receiver which can decode multiple concurrently received FH-MFSK signals and provide an output signal indicative of the correct signal under conditions where the decoded received signal results in one or more sequences which share a maximum value equal to or less than L or some predetermined absolute obtainable value.

SUMMARY OF THE INVENTION

The foregoing problem has been solved in accordance with the present invention which relates to a spread spectrum frequency-hopping (FH), multilevel frequency shift keying (MFSK) receiver and, more particularly, to a spread spectrum L-length FH address sequence, $2^K$ level FSK receiver which is capable of choosing one of one or more of the $2^K$ levels having a maximum detected sequence value equal to or less than L or some predetermined absolute value for conversion to a particular user's originally transmitted message.

It is an aspect of the present invention to provide a FH-MFSK receiver including a majority logic decision processor capable of providing an indication of the MFSK level having the maximum likelihood of being the correct user's transmitted signal under conditions where errors are introduced by, for example, multipath signal fading and/or noise.

Other and further aspects of the present invention will become apparent during the course of the following description and by reference to the accompanying drawings.

BRIEF DESCRIPTION OF THE DRAWING

Referring now to the drawings, in which like numerals represent like parts in the several views.

DETAILED DESCRIPTION

Figure 1:
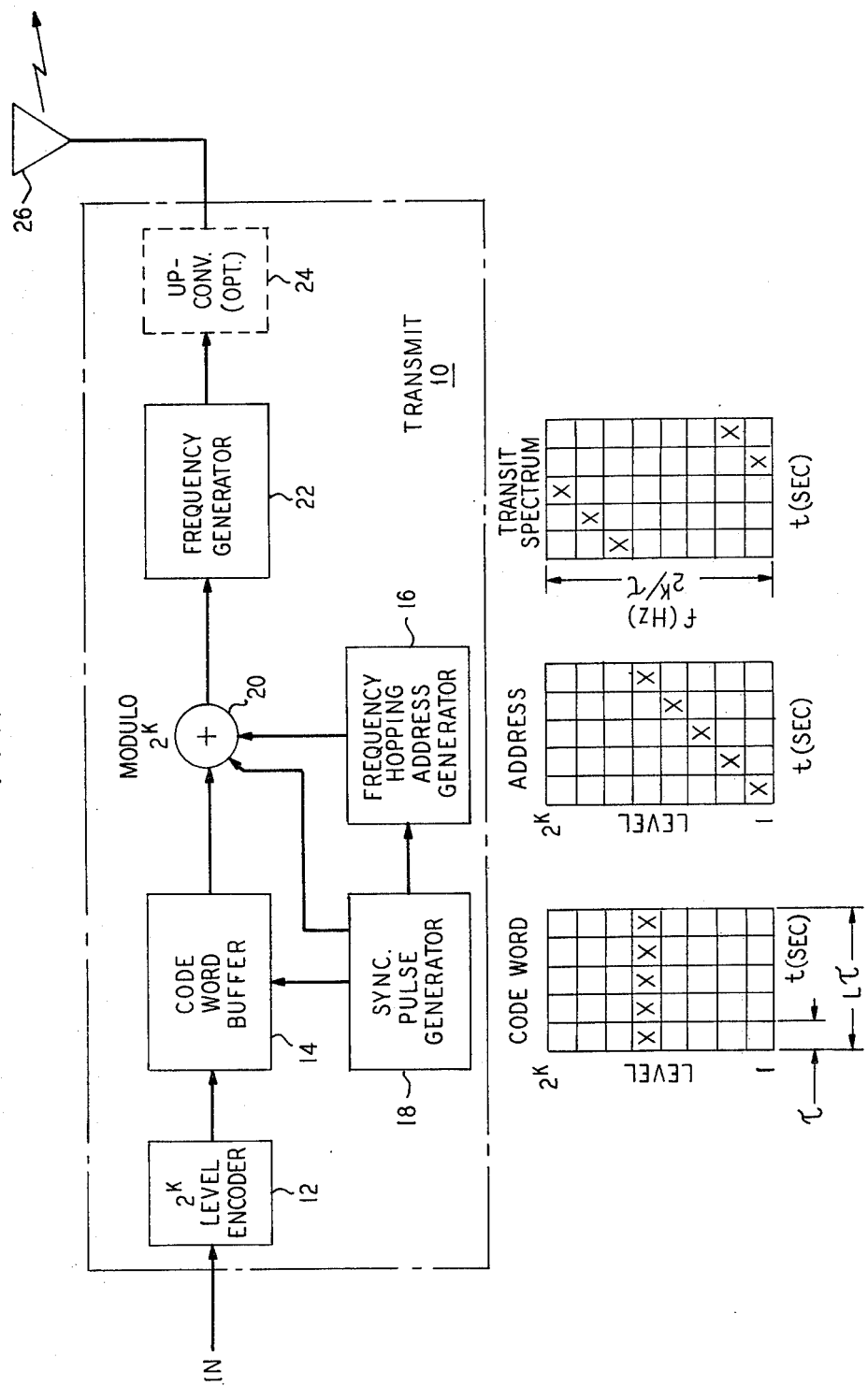
FIG. 1 is a block diagram of a FH-MFSK transmitter in accordance with the present invention.

A block diagram of a typical spread spectrum frequency-hopping, multilevel frequency shift keying (FH-MFSK) transmitter for use, for example, in a mobile radio communication system in accordance with the present invention is shown in FIG. 1. The transmitter 10 comprises a $2^K$ level encoder 12 which functions, for example, to periodically sample an analog input signal from a particular system user and convert the amplitude level of each sample into an equivalent level of a $2^K$ level code. If, on the other hand, the input signal from the particular system user is in binary form, encoder 12 can operate, for example, to convert each group of K sequential bits into an equivalent level of the $2^K$ level code. In either case, the resultant equivalent level of the code is stored temporarily in a code word buffer 14 as a word comprising L elements of the same code level with each element, hereinafter to be termed a "chip", having a duration of $\tau$ seconds. An exemplary code word is shown in the matrix in FIG. 1 below code word buffer 14 and designated "Code Word" where the code word comprises 5 chips, where $L=5$, and each chip has an indication in the $5^{th}$ level of a possible 8 levels, where $K=3$.

A frequency-hopping address generator 16 functions to generate a unique frequency-hopping address code word which is different for each system user within the same zone or cell. The address code word is a sequence of L chips with each chip having a duration of $\tau$ seconds and comprising one level of a $2^K$ level code which can be a different level for each chip of the address word. For example, as shown in the matrix designated "Address" below generator 16 in FIG. 1, an address word for a particular system user may comprise five chips, where $L=5$, where chips 1-5 are designated code levels 1-5, respectively, within the $2^K$ possible code levels for each chip.

A synchronizing pulse generator 18 functions to generate pulses from an internal clock for causing the corresponding chips of both the code word and address word to be concurrently transmitted to a modulo-$2^K$ adder 20. Adder 20 functions to modulo-$2^K$ add the corresponding chips of the code and address word to generate a new L-length code word as shown in, for example, the matrix designated "Transmit Spectrum" in FIG. 1. This resultant new code word is used by a frequency generator 22 to generate a particular one of $2^K$ frequencies, within the system's overall bandwidth, for each chip of $\tau$ second duration of the new code word as designated by the corresponding level of each chip of the Transmit Spectrum code word. For example, for the "Transmit Spectrum" matrix of FIG. 1, frequency generator 22 will transmit a frequency corresponding to the $2^{K-2}, 2^{K-1}, 2^K, 1, 2$ level during the $\tau$ second duration of chips 1-5, respectively. This sequence of L tones or frequencies can be unconverted by optional upconverter 24 into the proper system transmit frequency spectrum if not already done so by generator 22 for transmission by antenna 26.

It is to be understood that elements 12, 14, 16, 18, 20, 22 and 24 of transmitter 10 can comprise any suitable circuit which will perform the functions indicated hereinbefore. For example, buffer 14 and address generator 16 can comprise memory devices which temporarily store the code word of permanently store the address word, respectively, for accessing at the appropriate time.

In summary, at transmitter 10, K source bits are accumulated in a buffer 14 and held for $L\tau$ seconds while they are added modulo-$2^K$ as a K-bit word to each of the elements of the address word from generator 16. The sums determine the sequence of transmitted frequencies. In this way, K bits are transmitted during $L\tau$ seconds so that the data rate is $$R = K/L\tau \text{ bits/sec.} \quad (1)$$

The $2^K$ possible tones are mutually orthogonal over $\tau$ seconds; this orthogonality requires a bandwidth of $$W = 2^K/\tau \text{ Hz.} \quad (2)$$

In practice, W and R are design constraints and equations (1) and (2) are restrictions on K, L and $\tau$. Therefore, the elementary signals are a set of $2^K$ tones, each of duration $\tau$ seconds. Each link or user pair in the system is identified by an address which is a sequence of L K-bit words. A new code word, conveying K bits, is transmitted every $L\tau$ seconds as a sequence of L tones. Each tone is determined by the sum (modulo-$2^k$) of a K-bit word from the source and one of the K-bit address words.

Figure 2:
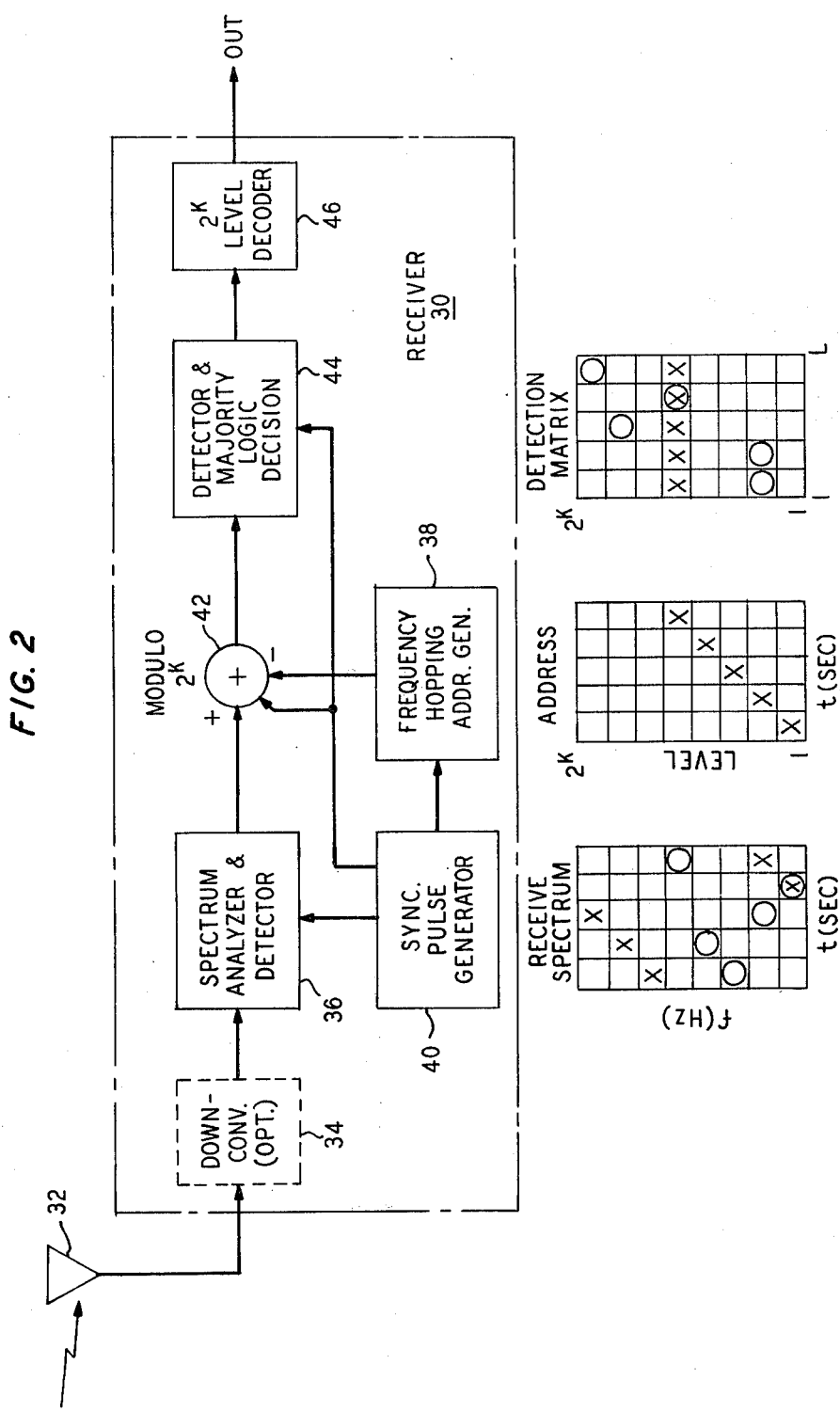
FIG. 2 is a block diagram of a FH-MFSK receiver capable of receiving multiple FH-MFSK signals and choosing a desired user's signal therefrom in accordance with the present invention.

FIG. 2 illustrates a receiver 30 in accordance with the present invention capable of receiving and decoding a FH-MFSK signal transmitted by a transmitter of FIG. 1. The FH-MFSK signal is received at an antenna 32 and downconverted, if necessary, by an optional downconverter 34 to a proper frequency band prior to further processing. The received or downconverted signal is processed by a spectrum analyzer and detector circuit 36 to determine which of the $2^K$ frequencies or tones are present. The received signal is a composite of the time-synchronous tone sequences of a plurality of transmitters. Spectrum analyzer and detector circuit 36 can comprise $2^K$ tone detectors for determining which of the $2^K$ tones are present. Each tone detector then would decide, every $\tau$ seconds, whether the received signal contains energy at a separate distinct one of the $2^K$ frequencies. The matrix of received energy in FIG. 2 shows the transmitted tones of FIG. 1 and the tones, indicated by circles, received from on other link.

Figure 3:
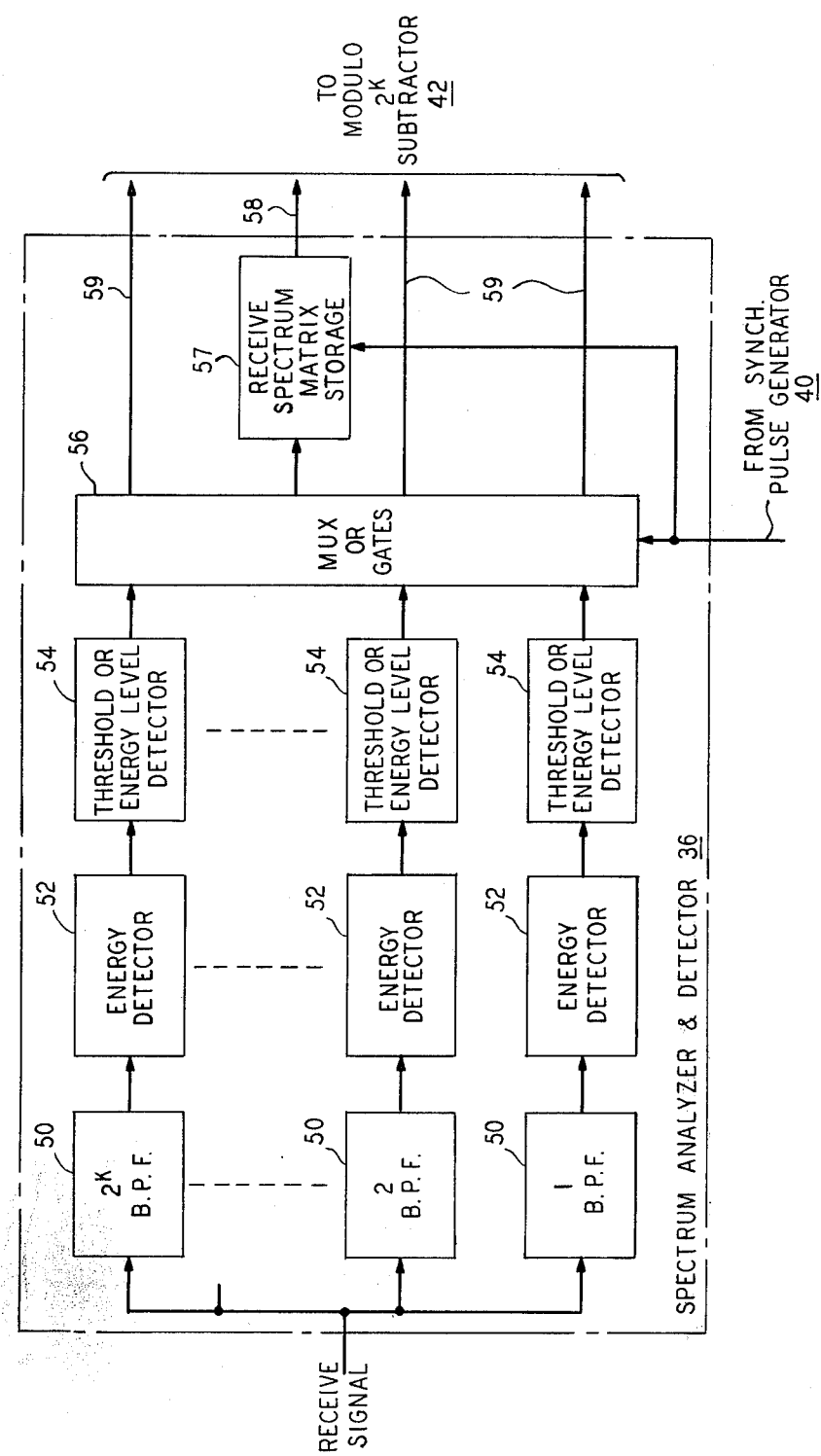
FIG. 3 is a block diagram of an exemplary spectrum analyzer and detector arrangement for use in a receiver of FIG. 2.

FIG. 3 illustrates an arrangement for spectrum analyzer and detector circuit 36, which arrangement is for purposes of exposition only and not for purposes of limitation since any suitable spectrum analysis and detection arrangement can be used. In the arrangement of FIG. 3, the received signal from antenna 32 or optional downconverter 34 is applied to a set of $2^K$ bandpass filters 50, each filter being tuned to pass a separate one of the $2^K$ possible tones or frequencies within the spread spectrum range as shown in the "Receive Spectrum" matrix of FIG. 2. The signal passed by each of bandpass filters 50 is applied to a separate energy detector 52 which functions to detect the energy in the signal passing therethrough. The output signal from each of energy detectors 52 is applied to a separate Threshold or Energy Level Detector 54 which converts the energy level detected by detector 52 into a binary "1" or "0" if the energy level exceeds or does not exceed the threshold level, respectively, when this detector acts as a threshold detector. Alternatively, when detector 54 acts as an energy level detector, this detector may act to convert the magnitude of the detected energy into a multibit binary output signal.

In response to pulses from synchronizing pulse generator 40, when it is desired to temporarily store the detected signals, a multiplexer 56 can be used to cause each of the resultant output signals from each of the $2^K$ threshold or energy level detectors 54 to be sequentially transmitted to a receive spectrum matrix storage means 57 for temporary storage before transmission over lead 58 to modulo-$2^K$ subtractor 42. Alternatively, where it is desired to transmit the detected output signals directly to the modulo-$2^K$ subtractor 42, circuit 56 can comprise a plurality of $2^K$ gates responsive to pulses from generator 40 to concurrently transmit the $2^K$ detected output signals over leads 59 to the modulo-$2^K$ subtractor 42. In either case, the Receive Spectrum matrix comprises FH-MFSK signals from multiple users concurrently received at antenna 32 and processed by spectrum analyzer and detector 36 as indicated by the "Xs" and "Os" in FIG. 2.

In FIG. 2 a frequency-hopping address generator 38 is capable of generating the unique address code word of the desired user whose signal is received and to be decoded. As shown in the "address" matrix in FIG. 2, this is the same address code word generated at the transmitter of FIG. 1. A synchronizing pulse generator 40 generates pulses which permit corresponding elements in the received FH-MFSK signal and the address code word to be concurrently transmitted to a modulo-$2^K$ subtractor 42 where the address level is modulo-$2^K$ subtracted from the detected levels of the received signal to generate a Detection matrix shown in FIG. 2. The Detection matrix shows the resultant elements from the user of FIG. 1, as indicated by the "Xs", and also the elements of the other link, as indicated by the circles, which resulted from the modulo-$2^K$ subtraction of the same address elements from the received tones or frequency components from that other link.

Figure 4:
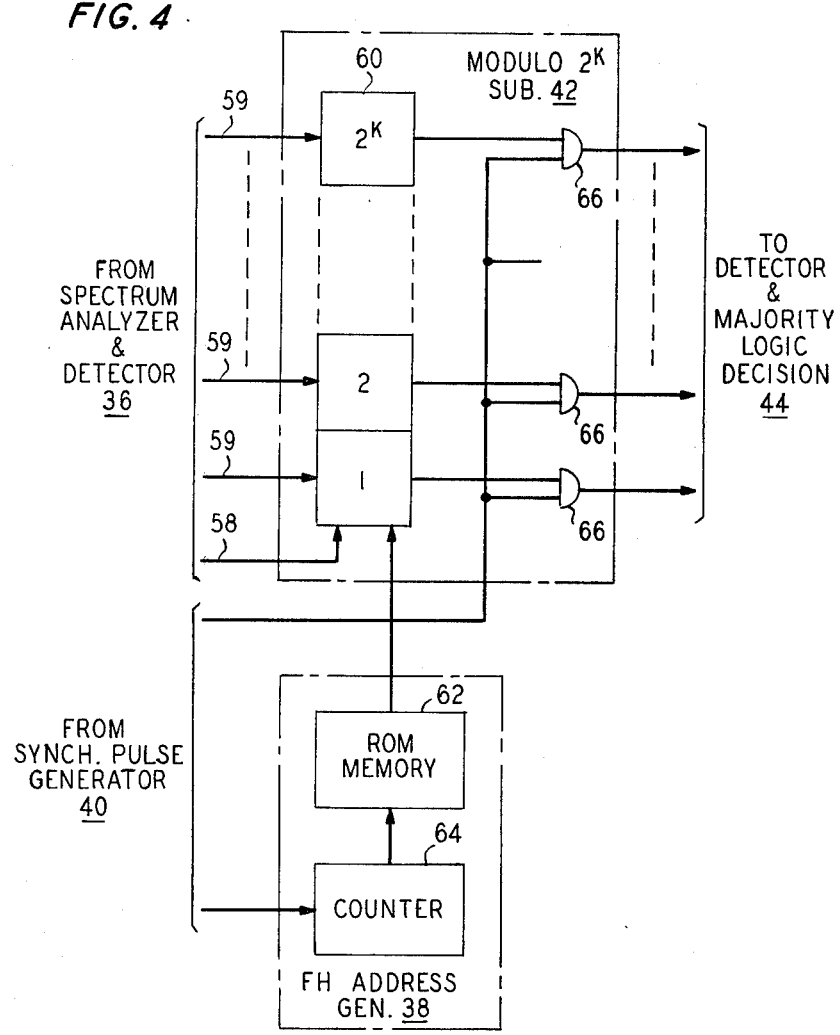
FIG. 4 is a block diagram of an exemplary modulo-$2^K$ subtractor and a frequency-hopping address generator for use in the receiver of FIG. 2.

FIG. 4 is a block diagram of an exemplary modulo-$2^K$ subtractor 42 and a frequency-hopping address generator 38 for use in the receiver of FIG. 2. Such circuitry can similarly be applied to the modulo-$2^K$ adder 20 and the FH address generator 16 in the transmitter of FIG. 1. It is to be understood that the arrangements shown in FIG. 4 are not for purposes of limitation since any other suitable device may be used as, for example, a $2^K$ by $2^K$ switching matrix for the modulo-$2^K$ subtractor 42 which is under the control of the FH address generator 38. The modulo-$2^K$ subtractor 42 shown in FIG. 4 comprises a shift register 60 including $2^K$ stages which can be concurrently inputted on leads 59 from the $2^K$ detectors 54 of spectrum analyzer and detector circuit 36 or serially inputted on lead 58 from circuit 36, and a plurality of $2^K$ gates 66 which are responsive to an enable pulse from synchronizing pulse generator 40 to gate the contents of shift register 60 to detector and majority logic decision circuit 44.

The FH address generator 38 shown in FIG. 4 comprises a ROM memory 62 which stores one or more of the various FH address codes of desired system users and a counter 64 which is responsive to an enable pulse from the synchronizing pulse generator 40 at the start of a message transmission, the first chip interval, and for each successive chip interval for causing the memory 62 to transmit the appropriate count to be subtracted modulo-$2^K$ during each chip interval for a particular user in accordance with his address code word. For example, for the address shown in the FIG. 2 address matrix, the address generator 38 of FIG. 4 would transmit a $-1$, $-2$, $-3$, $-4$ and $-5$ for each of the 1-5 chip intervals, respectively, to modulo-$2^K$ subtractor 42.

In operation, the signals from spectrum analyzer and detector circuit 36 are appropriately entered into the $2^K$ stages of register 60 during each chip interval and the associated chip interval signal from FH address generator 38 causes register 60 to appropriately cyclically shift the contents the amount indicated by generator 38. Once the shifting has been completed, an enable signal from synchronizing pulse generator 40 causes a plurality of $2^K$ gates 66 to concurrently transmit the contents of the $2^K$ stages of register 60 to detector and majority logic decision circuit 44. For example, using the address code word in the matrix of FIG. 2, during the first chip interval the contents of register 60 would be shifted downwards modulo-$2^K$ one stage before transmission to detector and majority logic decision circuit 44. Similarly, the contents stored in register 60 during chip intervals 2-5 would be shifted downwards modulo-$2^K$ a total of 2 to 5 stages, respectively, before being gated out to circuit 44. The output of modulo-$2^K$ subtractor 42 in FIG. 2 over the L chip intervals results in a Detection matrix shown in FIG. 2 for a particular user having the address code word shown.

Figure 5:
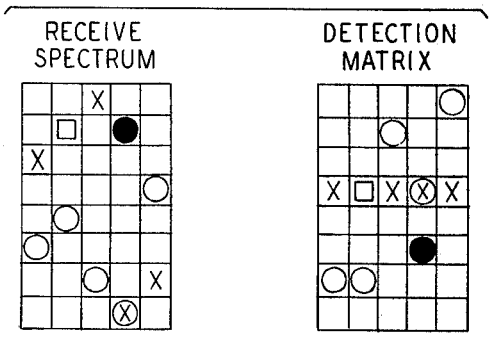
FIG. 5 is a typical Receive Spectrum and Detection matrix which include false alarms and deletions.

In the absence of transmission impairments, the transmitted code word always results in a complete row of entries in the Detection matrix. Errors can occur when the tones from other links combine to form other complete rows in the Detection matrix. It becomes evident that as the number of users increases, the greater becomes the possibility that multiple complex rows might exist. Additionally, thermal noise in the receiver can also influence the Detection matrix since such noise can cause a tone to be detected when no such tone was originally transmitted, also known as a false alarm, or cause a transmitted tone to be omitted which is also known as a deletion. The effects of a false alarm and a deletion on the receive spectrum and the detection matrix of FIG. 2 is shown in FIG. 5 where squares indicate a tone deleted from a transmitted word and a solid circle indicates a false alarm. Therefore, as the amount of system users increases the possibility of multiple complete rows also increases. This compounded with the possibility of false alarms and deletions makes the choice of the correct one of the $2^K$ levels in the Detection matrix difficult at times.

The output from modulo-$2^K$ subtractor 42 is transmitted to a detector and majority logic decision circuit 44 where they are further processed. Detector and majority logic decision circuit 44 interrogates the Detection matrix to determine which of the $2^K$ levels have a maximum length or, alternatively, a maximum value. Where only one level has such maximum length or value, that level indication is transmitted to a $2^K$ level decoder 46 which converts the indicated level to either a K-bit binary message or an analog signal sample having an amplitude corresponding to the indicated level depending upon the type of reception necessary by the ultimate user. From the Detection matrix of FIG. 2, it can be seen that only the received signals with the "X" frequency components result in a full row in the Detection matrix, barring false alarms or deletions, and, therefore, is the correct signal to be decoded. The resultant circle components from the other link are scattered at various levels throughout the detection matrix although one component does overlap the desired user's component.

Figure 6:
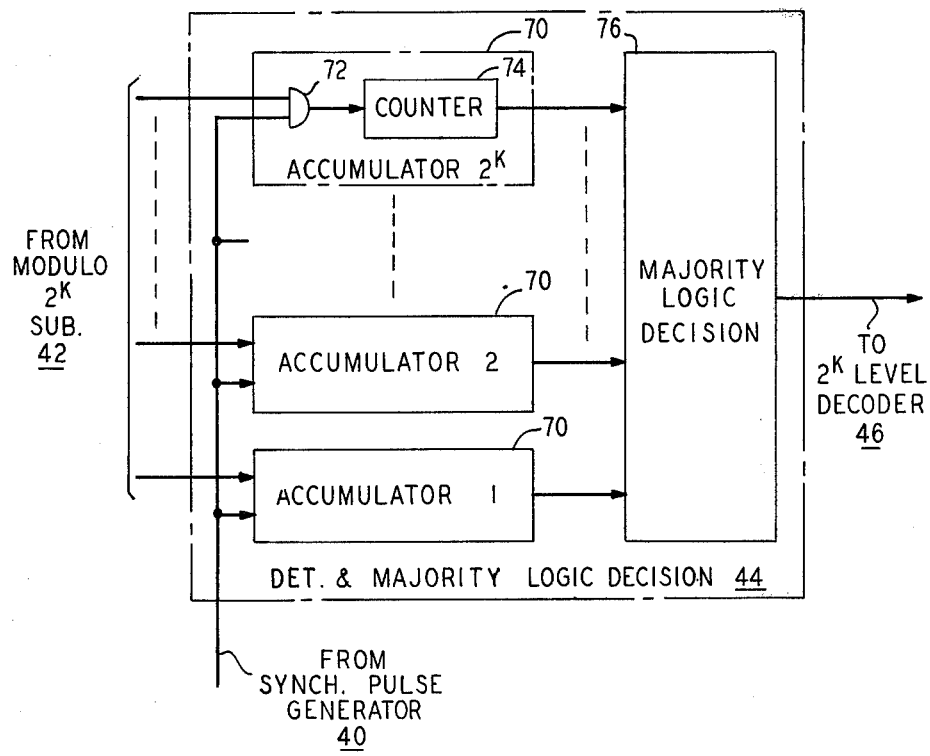
FIG. 6 is a block diagram of a typical Detector and Majority Logic Decision arrangement for use in the receiver of FIG. 2 in accordance with the present invention.

As shown in FIG. 2, the $2^K$ level signals at the output of the modulo-$2^K$ subtractor 42 during each chip interval, $\tau$, which form the overall detection matrix are applied to a detector and majority logic decision circuit 44 to determine which is the correct one of the $2^K$ levels associated with the user whose address code word was used in the subtraction process. FIG. 6 is a block schematic of a typical detector and majority logic decision circuit 44 which is exemplary only and not presented for purposes of limitation since any suitable device may be employed which functions as described hereinafter.

In FIG. 6 each of the $2^K$ level signals from modulo-$2^K$ subtractor 42 is applied at the input to a separate associated accumulator means 70. More particularly, during each chip interval, $\tau$, the individual signal at the output of modulo-$2^K$ subtractor 42 associated with a particular one of the $2^K$ levels, as indicated by the detection matrix of either FIGS. 2 or 5, is gated by gate 72, in response to an enable signal from synchronizing pulse generator 40 during each chip interval, to a counting means 74. Counting means 74 is reset at the beginning of each L-length frame sequence and counts the number of "1s" during chip intervals 1-L when a threshold detector is used in circuit 54 of FIG. 3, or provides a total summation of binary signals indicating the energy level during each of chip intervals 1-L when circuit 54 of FIG. 3 is an energy level detector. In either case the resultant count at the end of the L chip interval frame is transmitted to a majority logic decision circuit 76 which looks for the level with the maximum count. The maximum count in turn indicates the level which should correspond to the correct message level for the particular user associated with the particular user's address code word used.

Figure 7:
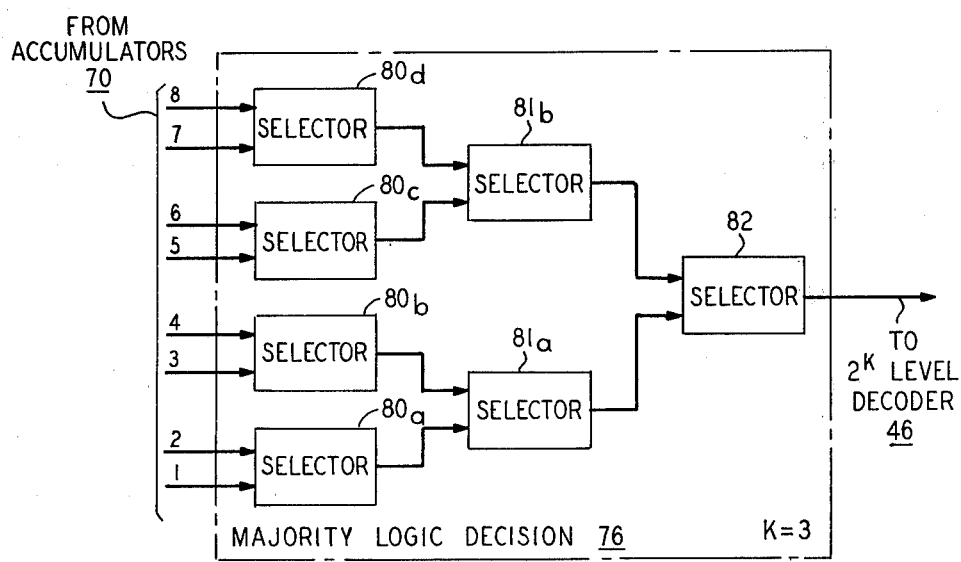
FIG. 7 is a block diagram of a typical Majority Logic Decision circuit for use in the arrangement of FIG. 6 in accordance with the present invention.

FIG. 7 is a block schematic of an exemplary majority logic decision circuit 76 having 8 inputs for the condition where K=3 which is presented for purposes of exposition only and not for purposes of limitation since any suitable circuit may be substituted. In the arrangement of FIG. 7, the inputs are paired and each pair of inputs is applied to a separate first stage selector circuit 80. Each selector effectively compares the magnitude of each count of the pair of input signals and selects the larger of the two for transmission to the next stage selector 81. For example, selector $80_a$ chooses the larger of inputs 1 and 2 while selector $80_b$ selects the larger of the inputs 3 and 4 for transmission to selector $81_a$. The selectors 81 similarly choose the larger one of the two inputs for transmission to third stage selector 82 which chooses the larger one of the two remaining inputs for transmission to a $2^K$ level decoder 46. In this manner, the input 1-8 having the largest value will be sent on to the $2^K$ level decoder 46 as the level associated with the particular user whose address code word was previously used to produce the Detection matrix. With the arrangement of FIG. 7, K stages of selectors are necessary with a total of $2^K-1$ selectors.

The $2^K$ level decoder 46 converts the level indicated as having a maximum value by majority logic decision circuit 76 into the proper associated K bits for transmission to the user in binary form or for conversion to an associated analog signal sample having the amplitude indicated by the resultant K bits. As indicated above, the majority logic circuit must provide both the level number and the count to each of the selectors 80, 81 and 82 having the larger count.

Figure 8:
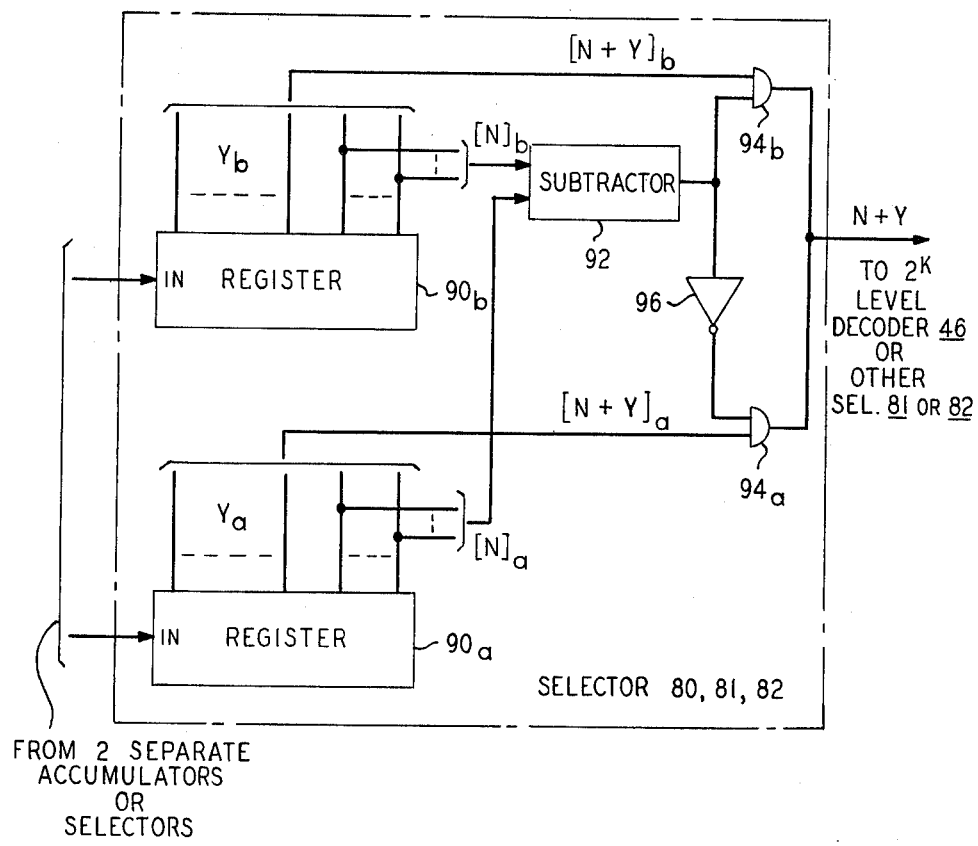
FIG. 8 is a block diagram of a typical selector for use in the Majority Logic Decision circuit of FIG. 7.

An exemplary selector arrangement for any of selectors 80, 81 or 82 is shown in FIG. 8 and it is to be understood that any other suitable selector arrangement may be substituted therefor. Each input signal to the selector 80, 81 or 82 comprises a code word which includes a first section indicating the count (N) from the associated accumulator 70 and a second section indicating, for example, the level Y (from the $2^K$ possible levels) associated with that count. Each of the pair of input signals to a selector is stored in a separate register $90_a$ and $90_b$. The count (N) stored in each register is applied to a subtractor circuit 92 which, for example, outputs a "1" if the count in register $90_b$ is larger than the count in register $90_a$ and a "0" if the reverse occurs or both counts are equal. A "1" output from subtractor 92 enables gate $94_b$ but not gate $94_a$ and the count ($N_b$) and level ($Y_b$) stored in register $90_b$ is gated to the next selector 81 or 82 or the $2^K$ level decoder 46. A "0" output from subtractor 92 does not enable gate $94_b$ but inverter 96 causes the enabling of gate $94_a$ to permit the transmission of the count ($N_a$) and level ($Y_a$) to the next selector or the $2^K$ level decoder 46.

As described hereinbefore, false alarms and deletions can produce multiple rows which have an equal resultant count. Where a threshold detector is used for circuit 54 of FIG. 3, only zeros and ones will be outputted and a greater likelihood of multiple maximum count rows exists when compared with the condition where an energy level detector is used for circuit 54 since a finer gradation is used. More particularly, an energy level detector may provide a binary indication between 0 and 32 for the energy level measured during each chip interval and when adding the sum of each measured energy level during L chip intervals the probability of two levels having the exact same count is very remote when compared to the addition of L zeros or ones for the threshold detecting arrangement.

Figure 9:
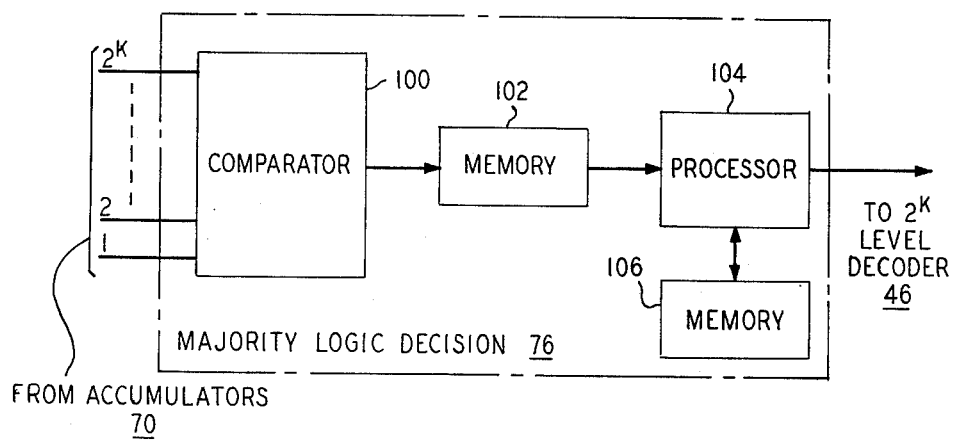
FIG. 9 is a block diagram of an alternative arrangement for the Majority Logic Decision circuit for use in the arrangement of FIG. 6 in accordance with the present invention.

An alternative arrangement for majority logic decision circuit 76 is shown in FIG. 9 where each of the outputs from the $2^K$ accumulators 70 are presented as separate inputs to a comparison means 100. Comparison means 100 functions to compare all of the input signals and determine which of the $2^K$ inputs have a maximum count. These one or more inputs having such maximum value are stored in a memory 102 for subsequent use by a processor 104. If processor 104 determines that only one maximum input signal is stored in memory 102, it transmits the level information to the $2^K$ level decoder 46 and concurrently stores the level information in an associated memory 106 as the last-look level indication. Also stored in memory 106 may be information relating to the level determined by the most recent x last-looks and possibly the direction or trend of travel in the $2^K$ possible levels. This latter information comes into use in determining the most likely correct level when two or more levels concurrently have a maximum value and are stored in memory 102.

Where two or more levels are determined by comparison means 100 to have the maximum value of the $2^K$ levels, processor 104 can interrogate memory 106 to determine the direction or trend produced by the last x last-look signals and then choose the one of the two or more maximum signal levels which most closely continues the direction or trend. For example, if the last five last-look signals indicate a downward trend, then if the latest determination has a signal just below the last last-look signal and a second signal far above the last last-look signal it would be most likely that the first signal is the correct signal and processor 104 would store this signal as the latest last-look signal and pass it on to $2^K$ level decoder 46 as the determined correct signal. It is to be understood that the arrangement of FIG. 9 is most appropriate where decoder 46 converts the determined maximum $2^K$ level into an analog signal sample of a particular amplitude, since the possibility of a trend, direction continuation or closeness of the next signal sample height is greater with such encoding than with the subdivision of K sequential bits of a bit stream for encoding into a $2^K$ level.

It is to be understood that the above-described embodiments are simply illustrative of the principles of the invention. Various other modifications and changes may be made by those skilled in the art which will embody the principles of the invention and fall within the spirit and scope thereof.

We claim:

1. A spread spectrum radio receiver (30) capable of receiving one or more frequency-hopping, multilevel frequency shift keyed (FH-MFSK) signals which were remotely transmitted by modulating a separate one of a plurality of different L-length frequency-hopping address sequences with each user's separate signal sample where each signal sample is encoded as one of $2^K$ possible frequencies; the receiver comprising:

spectrum analyzing means (36) capable of generating, in reponse to a received signal, an output signal indicating each of the possible $2^K$ frequencies in the received FH-MFSK signal during each period of the L-length sequence;

frequency-hopping address generating means (38) capable of generating an L-length frequency-hopping address sequence associated with a particular user in synchronism with the received L-length signal;

means (42) capable of demodulating the output signal from the spectrum analyzing means with the address sequence from the frequency-hopping address generating means to generate a set of signals forming a $2^K$ level by L-length detection matrix of received demodulated message signals

CHARACTERIZED IN THAT the receiver further comprises:

majority logic determination means (44, 46) capable of determining which of the $2^K$ levels of the matrix generated by the demodulating means have a maximum value for the decoded message signals and for generating an output signal representative of the originally encoded message signal indicated by one of such $2^K$ determined maximum value levels under conditions where the determined maximum value is equal to or less than a predetermined absolute value and one or more of such maximum value levels have been found.

2. A spread spectrum radio receiver according to claim 1

CHARACTERIZED IN THAT the spectrum analyzing means comprises:

energy detection means (50, 52) capable of detecting the presence of energy in each of the $2^K$ possible frequencies in the received FH-MFSK signal during each period of the L-length sequence; and threshold detecting means (54) capable of separately comparing the detected energy level in each of the $2^K$ possible frequencies during each period of the L-length received signal with a predetermined threshold level and generating a first signal when the detected energy level of a possible frequency exceeds the threshold level and a second signal when the detected energy level of a possible frequency does not exceed the threshold level.

3. A spread spectrum radio receiver according to claim 1

CHARACTERIZED IN THAT the spectrum analyzing means comprises:

energy detection means (50, 52) capable of detecting the presence of energy in each of the $2^K$ possible frequencies in the received FH-MFSK signal during each period of the L-length sequence; and energy level detecting means (54) capable of generating a separate multibit digital signal representative of the magnitude of the energy level detected for each of the $2^K$ possible frequencies during each period of the L-length received signal sequence.

4. A spread spectrum radio receiver according to claim 1, 2 or 3

CHARACTERIZED IN THAT the demodulating means (42) comprises a modulo-$2^K$ subtractor capable of modulating the output signals of the frequency-hopping address generating means (38) and the output signals generated by the spectrum analyzing means to generate the signals forming the detection matrix.

5. A spread spectrum radio receiver according to claim 1, 2 or 3

CHARACTERIZED IN THAT said majority logic determination means comprising:

a plurality of $2^K$ accumulation means (70), each accumulation means being capable of adding each of the signals forming a separate one of the $2^K$ levels of the $2^K$ level by L-length detection matrix generated by the demodulating mean to provide an output signal representative of the total value of the addition; and a majority logic decision means (76) capable of comparing the output signals of the plurality of $2^K$ accumulation means and generating an output signal indicating the accumulation means having a maximum value output signal.

6. A spread spectrum radio receiver according to claim 5

CHARACTERIZED IN THAT the majority logic decision means (74) comprises:

a maximum of $2^K - 1$ selectors (80, 81 and 82) forming a maximum of K stages of selectors, each of the selectors (80) of the first stage comparing a separate plurality of output signals from the plurality of $2^K$ accumulation means and generating an output signal indicating both the accumulation means of the plurality compared having the maximum output value and the magnitude of said maximum output value, the selectors (81 and 82) of subsequent stages comparing the output signals from a separate plurality of prior stage selectors and passing therethrough the output signal from the prior selector having a maximum output value.

7. A spread spectrum ratio receiver according to claim 5

CHARACTERIZED IN THAT the majority logic decision means comprises:

comparison means (100) capable of comparing the $2^K$ output signals from the plurality of $2^K$ accumulation means and generating an output signal indicating which of the accumulation means generated a maximum value output signal; and processing means comprising a processor (104) and an associated storage means (106) capable of interrogating the output signal from said comparison means and (a) in response to said comparison means output signal indicating only one accumulation means having a maximum value output signal, generating an output signal indicating the accumulation means having said maximum value while storing in said storage means as a last-look value the identity of the accumulation means having the maximum value; and (b) in response to said comparison means output signal indicating that more than one accumulation means have equal maximum values, comparing the level associated with each accumulation means having said equal maximum value with one or more most recent last-look values stored in said storage means to determine which of said maximum valued accumulation means most nearly follows a pattern formed by said last-look values and, therefore, is the most likely one to be the correct one and generating an output signal indicating the accumulation means determined as the correct one while storing in said storage means as a last-look value the identity of the accumulation means determined as correct.

* * * * *

UNITED STATES PATENT AND TRADEMARK OFFICE
CERTIFICATE OF CORRECTION

PATENT NO. : 4,271,524

DATED : June 2, 1981

INVENTOR(S) : David J. Goodman, Paul S. Henry, and Vasant K. Prabhu

It is certified that error appears in the above–identified patent and that said Letters Patent are hereby corrected as shown below:

Column 3, line 66 "unconverted" should read --upconverted--. Column 4, line 8 "of" should read --or--. Column 4, line 54 "on" should read --one--.

Signed and Sealed this

Tenth Day of November 1981

[SEAL]

Attest:

GERALD J. MOSSINGHOFF

Attesting Officer  Commissioner of Patents and Trademarks